United States Patent Office 3,116,277
Patented Dec. 31, 1963

3,116,277
WATER-INSOLUBLE AZO-DYES PRODUCED FROM 2-AMINOARYL-BENZTRIAZOLE-1-OXIDE DIAZO COMPONENTS
Richard Gross, Frankfurt am Main, Hasso Hertel, Offenbach (Main), Werner Kirst and Reinhard Mohr, Frankfurt am Main, and Walter Staab, Offenbach (Main), Germany, assignors to Farbwerke Hoechst Aktiengesellschaft vormals Meister Lucius & Brüning, Frankfurt am Main, Germany, a corporation of Germany
No Drawing. Filed Jan. 11, 1961, Ser. No. 81,953
Claims priority, application Germany Jan. 15, 1960
6 Claims. (Cl. 260—146)

The present invention relates to new water-insoluble metalliferous azo-dyestuffs and to a process for their manufacture; more particularly it relates to new complex metal compounds of water-insoluble azo-dyestuffs of the following general formula

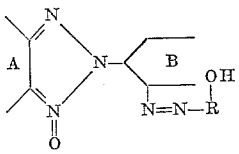

wherein A and B represent radicals of the benzene or naphthalene series which are free from groups imparting solubility in water, and R represents the radical of a coupling component being free from groups imparting solubility in water and coupling in a position adjacent to the hydroxy group, with the exception of the arylides of aromatic or heterocyclic ortho-hydroxycarboxylic acids, or of acylacetic acids.

Still more specifically, the present invention relates to complex metal compounds containing copper, cobalt or nickel, of water-insoluble azo-dyestuffs having the formula

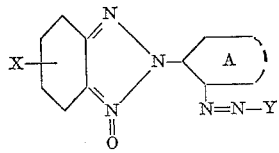

wherein X represents a member of the group consisting of hydrogen, chlorine, methoxy and methyl, A represents ortho-phenylene or ortho-naphthylene, the ortho-phenylene group being substituted by an alkyl, alkoxy or the acetylamino group, Y represents an aryl coupler containing a hydroxy radical ortho to the azo linkage of the above formula and is selected from the group consisting of 1-hydroxy-4-methyl-benzene, 1-hydroxy-4-chlorobenzene, 1,3-dihydroxy-benzene, 2,4 - dihydroxy - benzophenone, 3-hydroxy-diphenylamine, 2-hydroxy-naphthalene, 1-hydroxy-4-chloronaphthalene, 2,6 - dihydroxy-naphthalene, 3-hydroxy-diphenylene oxide, 2-hydroxy-carbazole and 3-hydroxy-carbazole.

U.S. patent application Serial No. 29,577 filed May 17, 1960 by Richard Gross et al. for "Water-Insoluble Azo-Dyestuffs Containing Metal and Process for Preparing Them" discloses a process for the preparation of water-insoluble metalliferous azo-dyestuffs wherein the diazonium compounds of amines of the following general formula

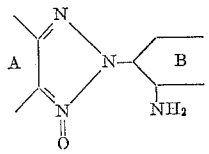

wherein A and B represent radicals of the benzene or naphthalene series are coupled in substance, on the fiber or on another substratum with arylides of aromatic or heterocyclic ortho-hydroxycarboxylic acids, or of acylacetic acids, the diazo and coupling components being free from groups imparting solubility in water such, for example, as sulfonic acid or carboxylic acid groups, and the dyestuffs so obtained are treated with agents yielding metal.

By this process there are obtained valuable azo-dyestuffs which possess, in addition to good general properties of fastness, especially good properties of fastness to light.

Now we have found that valuable metalliferous, water-insoluble azo-dyestuffs are also obtained by coupling in substance, on the fiber or on another substratum the diazonium compounds of amines of the following general formula

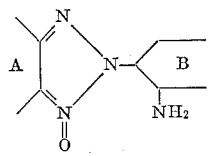

wherein A and B represent the radicals of the benzene or naphthalene series, with coupling components coupling in a position adjacent to a hydroxy group, with the exception of arylides of aromatic or heterocyclic ortho-hydroxycarboxylic acids, or of acylacetic acids, the diazo and coupling components being free from groups imparting solubility in water such, for example, as sulfonic acid or carboxylic acid groups, and treating the dyestuffs so obtained with agents yielding metal.

As amino compounds which correspond to the above formula and may advantageously be used in the process of the present invention, there are mentioned the amines disclosed in the aforementioned patent application hence, compounds in which the benzene or naphthalene radicals A and B may be substituted by groups which do not impart solubility in water such, for example, as halogen atoms, alkyl, alkoxy, aryloxy, acylamino, trifluoromethyl, sulfonic acid amide or carboxylic acid amide groups. These amino compounds may be prepared by the process disclosed in copending U.S. patent application Serial No. 13,710 filed March 9, 1960 (now abandoned) and the corresponding German Auslegeschrift 1,088,060 by Reinhard Mohr and Hasso Hertel for "2-(2'-Aminoaryl)-4,5-Arylene-1,2,3-Triazole-1-Oxides and Process for Preparing Them."

As coupling components being free from groups imparting solubility in water, such as sulfonic acid or carboxylic acid groups, there are used in the process of the present invention, compounds coupling in a position adjacent to a hydroxy group, i.e. aromatic or heterocyclic hydroxy compounds and compounds containing an enolizable or enolized ketomethylene group contained in a heterocyclic ring. Such compounds are for example the derivatives of phenol, substituted in the 4-position such, for example, as para-cresol, para-chlorophenol, 4-hydroxy-1.2-xylene, 4-hydroxy-acetophenone and hydroquinone-monomethyl-ether, the derivatives of α-naphthol substituted in the 4-position such, for example, as 4-chloro-1-naphthol, 4-methoxy-1-naphthol and 4-benzoyl-1-naphthol, β-naphthol and its derivatives such as 6-bromo-2-naphthol, 7 - hydroxy-2-methoxy-naphthalene, 1-benzoylamino-7-naphthol and 4-benzene-azo-1-amino-7-naphthol, and 6-hydroxyquinoline, 3-hydroxy-diphenylamine, 2-hydroxy-carbazole, 3-hydroxycarbazole, 3-hydroxy-diphenylene oxide and 1-aryl-3-methyl-5-pyrazolones. In addition to these monohydroxy compounds there may also be used as coupling components the polyhydroxy compounds of the aromatic or heterocyclic series coupling in the ortho-position to the hydroxy groups such as resorcinol, benzoyl-resorcinol, terephthaloyl-bis-resorcinol, 2.6-dihydroxynaphthalene and 3.6-dihydroxydiphenylene oxide.

The new dyestuffs can be produced in different manner. Vegetable fibers, including fibers of regenerated cellulose, can be impregnated for example with the alkaline solutions of the coupling components which in most cases are not or only little substantive, and the excess liquor is removed by pressing or centrifuging. After an eventual intermediate drying of the impregnated material to be dyed, the dyestuff formation can be effected in the usual manner in a developing bath containing the diazonium compound of one of the amines used according to the invention.

The metallization of the azo-dyestuffs can be effected in the developing bath by adding, prior to or during the coupling, agents yielding metal, and completing the metallization by increasing the temperature.

The metallization may also be effected after the formation of the dyestuff in a separate bath which is neutral, weakly acid or weakly alkaline and may contain, in addition to the agents yielding metal, dispersing agents or detergents, for example, a fatty alcohol polyglycol ether, an alkylphenol polyglycol ether, an alkylnaphthol polyglycol ether, a fatty acid polyglycol ester or a fatty acid amide polyglycol ether.

When the process is carried out in an appropriate manner, the new dyestuffs can also be produced on animal fibers such as wool or silk, or on synthetic fibers such as polyamide or polyvinyl alcohol fibers.

The dyestuffs can also be produced in substance and converted into complex metal compounds by treatment with agents yielding metal in aqueous solution or in organic solvents such as acetone or dimethylformamide. The dyestuffs so obtained are suitable for dyeing synthetic fibers and for coloring organic plastic masses of high molecular weight.

As agents yielding metal there are preferably used for the process of the present invention compounds yielding copper, cobalt and nickel which may be used in the form of their inorganic or organic salts such, for example, as chlorides, bromides, sulfates, nitrates, formiates or acetates, or as complex compounds especially with hydroxyalkylamines, such, for example, as diethanolamine, triethanolamine or N-methylethanolamine, or with aminocarboxylic acids such, for example, as aminoacetic acid or nitrilotriacetic acid, or with aliphatic hydroxycarboxylic acids, such, for example, as citric acid, tartaric acid, gluconic acid or glycolic acid or with alkali metal phosphates such, for example, as alkali metal pyrophosphates or alkali metal polyphosphates. When an agent yielding cobalt is used, the addition of compounds of hexavalent chromium or of other oxidizing agents such, for example, as alkali metal perborates, alkali metal persulfates or alkali metal percarbonates, has an advantageous effect on the metallization.

On vegetable fibers there are obtained by the process of the present invention dyestuffs which possess in addition to good general properties of fastness a very good fastness to light. The brown tints which may be obtained with the use of copper compounds are particularly valuable.

The following example serves to illustrate the invention but it is not intended to limit it thereto.

EXAMPLE

A cotton fabric was padded on the foulard with the following solution and dried:

14.4 grams of β-naphthol were made into a paste with 30 grams of a wetting agent of the type of the oil sulfonates and 10 cc. of sodium hydroxide solution of 38° Bé., the paste was dissolved with boiling water containing, per liter 3 grams of a tragacanth thickening, and made up to 1 liter.

The dried fabric was developed for 15 to 20 minutes at 20° C. and, after slowly heating the bath to 95° C., for 20 to 30 minutes at 90° C. to 95° C. at a long goods-to-liquor ratio, in the developing bath prepared as described below. The material was then rinsed with a solution containing, per liter of water, 3 cc. of hydrochloric acid of 20° Bé. and soaped for 15 minutes at 60° C. with a solution containing, per liter of water, 2 grams of soap, rinsed and dried.

*Developing Bath*

1.75 grams of 2-(2'-amino-4'.5'-diethoxyphenyl)-6-chlorobenztriazole-1-oxide in the form of a diazonium compound prepared in the usual manner were dissolved in 1 liter of water containing 2 grams of a reaction product from about 20 moles of ethylene oxide and 1 mole of octadecyl alcohol, 1 cc. of acetic acid of 50% strength, 7 grams of sodium acetate and 1.25 grams of copper sulfate.

A brownish black dyeing was obtained.

In the following table further components are listed which can be used in the process of the invention, and the tints produced by forming the metalliferous azo-dyestuffs from these components on the fibers, which tints likewise possess good fastness properties.

| Diazo component | Coupling component | Tint | | |
|---|---|---|---|---|
| | | copper complex | cobalt complex | nickel complex |
| 2-(2'-amino-4'.5'-diethoxy-phenyl)-6-chlorobenztriazole-1-oxide. | β-naphthol | brownish black. | yellowish brown. | brown. |
| Do | 4-chloro-1-naphthol | black brown | reddish dark brown. | reddish dark brown. |
| Do | resorcinol | grey brown | yellowish grey brown. | grey brown. |
| Do | 3-hydroxydiphenylene oxide. | black | yellow brown | yellow brown. |
| Do | terephthaloyl-bis-resorcinol. | yellowish dark brown. | reddish dark brown. | red brown. |
| Do | p-cresol | brownish grey. | brownish grey yellow. | brownish grey yellow. |
| Do | 2.6-dihydroxy-naphthalene. | reddish grey brown. | yellowish grey brown. | yellowish grey brown. |
| Do | 3-hydroxydiphenylamine. | dark brown | red brown | grey brown. |
| Do | 2-hydroxycarbazole | brownish black. | dark brown | yellowish dark brown. |
| Do | 2.4-dihydroxybenzophenone. | yellowish dark brown. | do | red brown. |
| Do | 3-hydroxycarbazole | black brown | bluish red brown. | greenish grey brown. |
| Do | p-chlorophenol | grey brown | yellow brown | greenish yellow brown. |

| Diazo component | Coupling component | Tint | | |
|---|---|---|---|---|
| | | copper complex | cobalt complex | nickel complex |
| 2-(2'-amino-4'-methoxy-5'-acetylaminophenyl)-benztriazole-1-oxide. | β-naphthol | brown | brown | brown. |
| Do | resorcinol | ----do---- | | Do. |
| Do | 3-hydroxydiphenylene oxide. | ----do---- | brown | |
| Do | 3-hydroxydiphenylamine. | greenish brown. | | |
| Do | 2-hydroxycarbazole | brown | brown | Do. |
| Do | 2.4-dihydroxybenzophenone. | ----do---- | ----do---- | Do. |
| Do | p-chlorophenol | ----do---- | | Do. |
| Do | 3-hydroxycarbazole | ----do---- | brown | Do. |
| 2-(2'-amino-4'-methoxy-5'-methylphenyl)-benztriazole-1-oxide. | β-naphthol | ----do---- | ----do---- | Do. |
| Do | resorcinol | ----do---- | ----do---- | Do. |
| Do | 4-chloro-1-naphthol | ----do---- | ----do---- | Do. |
| Do | 3-hydroxydiphenylene oxide. | ----do---- | ----do---- | Do. |
| Do | p-cresol | ----do---- | | Do. |
| Do | 3-hydroxydiphenylamine. | greenish brown. | brown | |
| Do | 2-hydroxycarbazole | brown | ----do---- | Do. |
| Do | 2.4-dihydroxybenzophenone. | ----do---- | ----do---- | Do. |
| Do | p-chlorophenol | ----do---- | ----do---- | Do. |
| Do | 3-hydroxycarbazole | ----do---- | ----do---- | Do. |
| 2-(2'-amino-4',5'-diethoxyphenyl)-6-methoxybenztriazole-1-oxide. | β-naphthol | ----do---- | ----do---- | Do. |
| Do | resorcinol | ----do---- | ----do---- | Do. |
| Do | 4-chloro-1-naphthol | ----do---- | ----do---- | Do. |
| Do | 3-hydroxydiphenylene oxide. | ----do---- | ----do---- | Do. |
| Do | p-cresol | ----do---- | ----do---- | |
| Do | 3-hydroxydiphenylamine. | ----do---- | ----do---- | Do. |
| Do | 2-hydroxycarbazole | ----do---- | ----do---- | Do. |
| Do | 2.4-dihydroxybenzophenone. | ----do---- | ----do---- | Do. |
| Do | p-chlorophenol | ----do---- | ----do---- | Do. |
| Do | 3-hydroxycarbazole | ----do---- | ----do---- | Do. |
| 2-(2'-amino-4'-methoxy-5'-acetylaminophenyl)-6-methylbenztriazole-1-oxide. | β-naphthol | ----do---- | ----do---- | Do. |
| Do | resorcinol | ----do---- | ----do---- | Do. |
| Do | 3-hydroxycarbazole | ----do---- | ----do---- | |
| 2-(2'-aminonaphthyl-1')-6-methoxybenztriazole-1-oxide. | 4-chloro-1-naphthol | ----do---- | brown | Do. |
| Do | p-chlorophenol | ----do---- | | |
| 2-(2'-aminonaphthyl-1')-6-methylbenztriazole-1-oxide. | 4-chloro-1-naphthol | ----do---- | brown | Do. |
| Do | p-cresol | ----do---- | | |
| 2-(2'-amino-4'-acetylamino-5'-methylphenyl)-benztriazole-1-oxide. | β-naphthol | ----do---- | brown | Do. |
| Do | resorcinol | ----do---- | | |
| Do | 4-chloro-1-naphthol | ----do---- | brown | Do. |
| Do | 3-hydroxydiphenylene oxide. | ----do---- | | |
| Do | 3-hydroxycarbazole | ----do---- | brown | Do. |
| 2-(2'-amino-4',5'-dimethoxyphenyl)-6-methylbenztriazole-1-oxide. | β-naphthol | ----do---- | ----do---- | Do. |
| Do | resorcinol | ----do---- | ----do---- | Do. |
| Do | 3-hydroxydiphenylene oxide. | ----do---- | ----do---- | Do. |
| Do | 3-hydroxydiphenylamine. | ----do---- | ----do---- | Do. |
| Do | 2-hydroxycarbazole | ----do---- | ----do---- | Do. |
| Do | 2.4-dihydroxybenzophenone. | ----do---- | ----do---- | Do. |
| Do | 3-hydroxycarbazole | ----do---- | ----do---- | Do. |
| 2-(2'-amino-4',5'-dimethylphenyl)-benztriazole-1-oxide. | β-naphthol | ----do---- | ----do---- | Do. |
| Do | resorcinol | ----do---- | ----do---- | Do. |
| Do | 4-chloro-1-naphthol | ----do---- | ----do---- | Do. |
| Do | 3-hydroxydiphenylene oxide. | ----do---- | ----do---- | Do. |
| Do | 3-hydroxydiphenylamine. | ----do---- | ----do---- | Do. |
| Do | 2-hydroxycarbazole | ----do---- | ----do---- | Do. |
| Do | 2.4-dihydroxybenzophenone. | ----do---- | ----do---- | red brown. |
| Do | p-chlorophenol | ----do---- | ----do---- | brown. |
| Do | 3-hydroxycarbazole | ----do---- | ----do---- | Do. |

We claim:

1. A complex metal compound containing a metal selected from the group consisting of copper, cobalt and nickel, of a water-insoluble azo-dyestuff having the formula

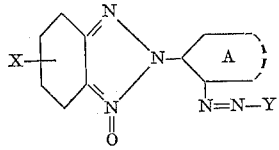

wherein X represents a member of the group consisting of hydrogen, chlorine, methoxy and methyl, A represents a member of the group consisting of ortho-phenylene and ortho-naphthylene, the ortho-phenylene group being substituted by a member of the group consisting of methyl, methoxy, ethoxy and acetylamino, Y represents an aryl coupler containing a hydroxy radical ortho to the azo linkage of the above formula and is selected from the group consisting of 1-hydroxy-4-methyl-benzene, 1-hydroxy-4-chloro-benzene, 1,3-dihydroxy-benzene, 2,4-dihydroxy-benzophenone, 3-hydroxy-diphenylamine, 2-hydroxy-naphthalene, 1-hydroxy-4-chloronaphthalene, 2,6- dihydroxy-naphthalene, 3-hydroxy-diphenylene oxide, 2-hydroxy-carbazole and 3-hydroxy-carbazole.

2. The copper complex compound of the water-insoluble azo-dyestuff having the formula

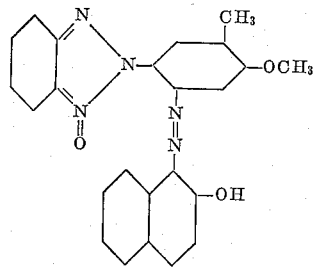

3. The copper complex compound of the water-insoluble azo-dyestuff having the formula

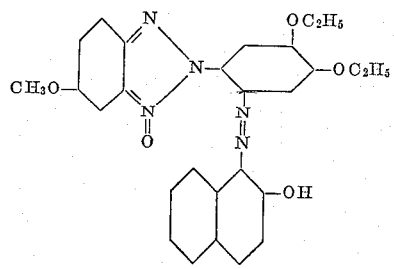

4. The copper complex compound of the water-insoluble azo-dyestuff having the formula

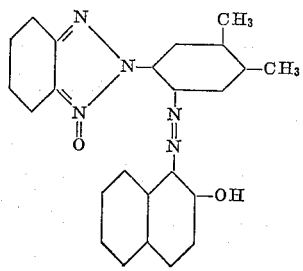

5. The copper complex compound of the water-insoluble azo-dyestuff having the formula

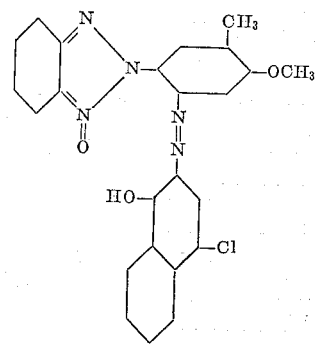

6. The copper complex compound of the water-insoluble azo-dyestuff having the formula

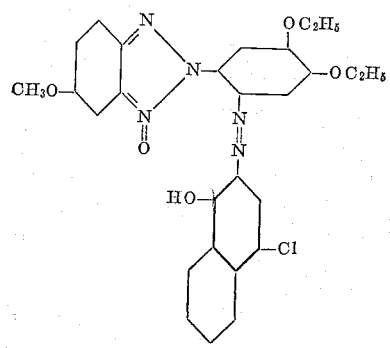

No references cited.